(12) United States Patent
Martin

(10) Patent No.: US 12,741,702 B2
(45) Date of Patent: Sep. 22, 2026

(54) APPARATUS AND METHOD FOR REDUCING DRAG ON MOVING VEHICLES

(71) Applicant: Timothy Sean Christopher Martin, Canberra (AU)

(72) Inventor: Timothy Sean Christopher Martin, Canberra (AU)

( * ) Notice: Subject to any disclaimer, the term of this patent is extended or adjusted under 35 U.S.C. 154(b) by 171 days.

(21) Appl. No.: 17/801,139

(22) PCT Filed: Mar. 10, 2021

(86) PCT No.: PCT/AU2021/050206
§ 371 (c)(1),
(2) Date: Aug. 19, 2022

(87) PCT Pub. No.: WO2021/189097
PCT Pub. Date: Sep. 30, 2021

(65) Prior Publication Data

US 2023/0073889 A1 Mar. 9, 2023

(30) Foreign Application Priority Data

Mar. 23, 2020 (AU) ................................ 2020900872

(51) Int. Cl.
*B62D 35/00* (2006.01)
*B60R 16/033* (2006.01)
(Continued)

(52) U.S. Cl.
CPC ............ *B62D 35/007* (2013.01); *B62J 17/00* (2013.01); *B60R 16/033* (2013.01); *B62D 29/00* (2013.01); *B62J 43/30* (2020.02)

(58) Field of Classification Search
CPC ....... B62D 35/007; D62D 37/02; B62J 17/00; B62J 17/10; B62K 18/48
(Continued)

(56) References Cited

U.S. PATENT DOCUMENTS 4,320,920 A * 3/1982 Goudey ............... B62D 35/001 296/180.4
4,660,879 A * 4/1987 Kobayashi ........... B62D 35/007 180/2.2
(Continued)

FOREIGN PATENT DOCUMENTS

CN 101111425 A * 1/2008 ................ B62J 7/04
CN 108137105 A * 6/2018 ........... B62D 35/001
(Continued)

OTHER PUBLICATIONS

CN108137105 Text (Year: 2018).*
(Continued)

*Primary Examiner* — Jacob S. Scott
(74) *Attorney, Agent, or Firm* — IP Attorneys Group, LLC

(57) ABSTRACT

An apparatus for reducing drag and wake formation behind moving vehicles such as road transport vehicles, motor cycles and bicycles including electric bicycles comprising one or more vents, each of those vents having a proximal end and a distal end, both ends being open and positioned and aligned longitudinally in the direction of travel in such a way as to addressing wake and boundary layer formation of a
(Continued)

moving vehicle, said vents, positioned spaced from turbulent rear surfaces of the vehicle and affixed to the main body of the vehicle by one or more connecting members.

18 Claims, 34 Drawing Sheets

(51) Int. Cl.
*B62D 29/00* (2006.01)
*B62J 17/00* (2020.01)
*B62J 43/30* (2020.01)

(58) Field of Classification Search
USPC ........................................ 296/180.1, 0.4, 0.2
See application file for complete search history.

(56) References Cited

U.S. PATENT DOCUMENTS 4,772,062 A * 9/1988 Janssen ................ B62D 35/007 296/180.5
5,199,762 A * 4/1993 Scheele ..................... B60S 1/58 296/180.1
6,378,932 B1 * 4/2002 Fasel .................... B62D 35/007 296/180.1
8,215,703 B2 * 7/2012 Goenueldinc .......... B62D 37/02 296/180.1
8,303,025 B2 * 11/2012 Senatro ................ B62D 35/001 296/180.1
8,770,649 B2 * 7/2014 Praskovsky .......... B62D 35/001 296/180.1
10,093,363 B2 * 10/2018 Brereton .............. B62D 35/001
2008/0150321 A1 * 6/2008 Neale ..................... B62D 35/00 296/180.1
2009/0302639 A1 * 12/2009 Neale ..................... B62D 35/00 296/180.1
2011/0095564 A1 * 4/2011 Chen .................... B62D 35/001 296/180.4
2013/0076068 A1 * 3/2013 Wayburn ............. B62D 35/004 296/180.1
2021/0403100 A1 * 12/2021 Hussein ............... B62D 35/001

FOREIGN PATENT DOCUMENTS

CN 114408031 A * 4/2022 ............... F03D 9/32
DE 19727685 C2 * 8/1999 ........... B62D 35/007

OTHER PUBLICATIONS

McLaren diffuser detail—Photo gallery—F1technical.net (Year: 2012).*
Unbreakable Spirit of F1: How Advanced Composites Changed Racing Forever (and Are Still Changing It in 2025!), https://f1race.com/2025/07/21/carbon-fiber-kevlar-and-the-unbreakable-spirit-of-f1-how-advanced-composites-changed-racing-forever-and-are-still-changing-it-in-2025/ (Year: 2025).*
F1—Rear wing change (2006) (https://www.youtube.com/watch?v=XtWKGE9HBQ0). (Year: 2006).*
Why do race cars have aerodynamic shape?, https://studyinsweden.se/blogs/2017/06/05/aerodynamic-race-cars/ (Year: 2017).*
3DRC Formula Aero Wings for 1/10th Formula cars, https://www.redrc.net/2017/09/3drc-formula-aero-wings-for-110th-formula-cars/ (Year: 2017).*
CN 101111425 (Year: 2008).*
CN 114408031 (Year: 2022).*
DE 19727685 (Year: 1999).*
3DRC Formula Aero Wings (Year: 2017).*
Carbon Fiber in F1 (Year: 2025).*
McLaren Rear Diffuser (Year: 2012).*
Why do race cars have aerodynamic shape? (Year: 2017).*

* cited by examiner

APPARATUS AND METHOD FOR REDUCING DRAG ON MOVING VEHICLES

CROSS-REFERENCE TO RELATED APPLICATION

This application is a national phase entry of International Application No.: PCT/AU2021/050206, filed on Mar. 10, 2021 and titled "AN APPARATUS AND METHOD FOR REDUCING DRAG ON MOVING VEHICLES," which claims priority to and the benefit of Australian Patent Application No.: 2020900872, filed on Mar. 23, 2020 and titled "AN APPARATUS AND METHOD FOR REDUCING DRAG ON MOVING VEHICLES." The contents of the above-identified Applications are relied upon and incorporated herein by reference in their entirety.

FIELD OF THE INVENTION

This invention relates to reducing drag and wake formation of moving vehicles such as road transport vehicles, motorcycles, scooters and bicycles including electric bicycles, and other electric-powered road transport vehicles.

BACKGROUND OF THE INVENTION

Air resistance is one of the greatest barriers for cyclists and motorists to overcome when riding or driving on a road. Various attempts have been made to reduce this resistance with varying degrees of success. However, most bicycles and other vehicles in which the rider sits up continue to have very poor aerodynamics, and a high coefficient of drag. While newer bicycles and other vehicles are being designed with better aerodynamics in mind, the human body is simply not well designed to slice through the air. Bicycle and other vehicle designers and inventors have experimented in developing alternative vehicle designs and HPVs (human-powered vehicles) with an emphasis on better aerodynamic performance.

Bicycle frame builders and other vehicle designers have been working on creating more aerodynamically efficient designs. Some recent designs have concentrated on shifting from round tubes to oval or tear-shaped tubes. There is a delicate balancing act between maintaining a good strength-to-weight ratio and improving aerodynamic efficiency.

Similarly, vehicle manufacturers are presented with challenges of improving fuel efficiency and of ever more strict regulation of carbon dioxide (CO2) and other emissions. Significant effort has gone into decreasing the driving resistance and hence the fuel consumption performance of motorised vehicles. Appropriate designs using aerodynamic principles play an important role because air resistance is the primary contributor to total driving resistance at velocities of 70 km/h and above.

Aerodynamic drag on bicycles or other road vehicles consists of two components: air pressure drag (also known as form drag) and direct friction (also known as skin drag, surface friction or skin friction). A blunt, irregular object disturbs the air flowing around it, causing flow to separate from the object's surface. Low pressure regions form behind the object, resulting in pressure drag. With high pressure in the front, and low pressure behind, the cyclist or motor vehicle is drawn backwards. Streamlined designs help the air close more smoothly around these bodies and reduce pressure drag. Direct friction occurs by the contact of air with the surface of the rider and the bicycle in motion. Racing cyclists often wear "skinsuits" in order to reduce direct friction. Of total drag on a road vehicle, direct friction, or "skin drag", is a small component in comparison with air pressure drag, or "form drag".

Motorised road vehicles are generally bluff bodies, of which the main source of air resistance is pressure drag. This drag involves formation of a wake region, and with increased velocity there is an increased pressure difference between the front and the rear of the vehicle. Therefore, understanding the behaviour of the wake in time and in space is crucial in order to accomplish the goal of drag reduction.

The wake flow of a vehicle significantly influences its aerodynamic performance and can affect the stability of high-speed driving. Therefore, optimization of the vehicle wake flow is an effective way to improve its aerodynamic performance and further improve the handling stability and fuel economy. When a vehicle is driven at high speed, the wake flow influences many elements of its performance. In other words, wake flow optimization is an effective method to improve the performance of a vehicle. It should be noted that the wake is a region of disturbed flow (often turbulent) downstream of a solid body moving through a fluid, arising from the flow of the fluid around the body.

Some earlier methods to reduce the drag of moving vehicles include fixing flaps to the tail edges which arouses different changes of wake flow, which generates different effects on lift and drag forces. Another common method is to install air deflectors to the surface of the tail. By changing the direction and the angle of the air deflectors, the velocity and structure of the wake flow can be changed. However, the optimizing of wake flow has seen further improvement. For example, a blower can be installed at the tail to optimize the wake flow. There have been some other active control methods used to optimize the wake flow.

The pressure variations around a moving vehicle show that pressure is found to be greatest at the front end of the car, whereas it reaches a minimum towards the rear end of the car. This reflects the presence of a wake region at the rear end of the vehicle, which presents an increase in the drag of the vehicle. A reduced wake region has a direct implication for the overall aerodynamic efficiency of the vehicle. As aerodynamics of motor vehicles have continued to improve, there have been consequent improvements of vehicle economy.

SUMMARY OF THE INVENTION

The present invention defines an improved and inexpensive way of reducing drag, applicable to an open-air vehicle such as a bicycle or to an enclosed road vehicle such as a motor car. The main aspects of the present invention are to provide a vent in such a position as to reduce the vehicle's drag, especially from wake formation, and having a length of the vent sufficient to develop laminar flow from adjacent surfaces. According to the present invention, the positioning of the vent is critical. The essential direction would be to place a vent with inlet addressing the rear surfaces and adjacent boundary layers. The vent is to be placed in longitudinal alignment with the vehicle, with the aim to reduce wake formation and to develop thrust.

The present invention for reducing drag and wake formation behind moving vehicles such as road transport vehicles, motorcycles, scooters and bicycles including electric bicycles comprises one or more vents, each of those vents having a proximal end and a distal end, both ends being open and positioned and aligned longitudinally in the direction of travel in such a way as to address wake and boundary layer formation of a moving vehicle, said vents, positioned spaced apart from turbulent rear surfaces of the vehicle and affixed to the main body of the vehicle by one or more connecting members.

From the vehicle's first movement, air contained in the vent is expelled, opposite to the vehicle's direction of travel. With continued movement of the vehicle, air flowing by the rear facing surfaces is drawn through the vent, and then expelled. By aligning with the vehicle's direction of travel, the frontal area added by the vent may be minimal.

The present invention is different from the prior art methods in that prior art methods are focussed on pumping air to rear surfaces of a vehicle rather than drawing from these surfaces. Specifically, the vent of the present invention draws air from rear surfaces and adjacent boundary layers, where other devices, like side-vents, channel air to the rear of the vehicle, but do not draw air from rear surfaces. The method of the present invention addresses directly the main areas of turbulence, especially the near wake region at rear surfaces, where other devices have a less direct effect, and effect a limited portion of the wake region.

Another aspect of the present invention is that the vent can be adapted for various dimensions or shapes of a vehicle, for example the rear surface of a cyclist.

In another embodiment of the invention, a propellor or fan attachment may be located inside the vent, and the rotation of the fan or propellor induced by the downstream airflow, and its efficiency improved. In this embodiment, the length of the vent is large compared with the propellor, and a large downstream flow is developed from rear surfaces of the propellor. The propellor or the fan can also be powered by an external power source such as a rechargeable battery.

DETAILED DESCRIPTION OF THE INVENTION

The preferred embodiments of the invention are now illustrated with reference to FIGS. 1 to 32.

The embodiments illustrated in FIGS. 1 to 14 are of an open-air vehicle such as a bicycle, where a rider forms an aerodynamic surface, from which turbulent flow and wake formation occur.

FIGS. 1, 3, 6, 8, 12 and 14 concern the regions of stagnation found usually after rear-facing surfaces of the rider, especially after the lower back and legs, and the development of laminar flow in these regions using the vent of the present invention.

FIG. 1 illustrates the use of this invention attached to a bicycle. A vent of the present invention assists in continuing the flow of air after rear-facing surfaces of a rider-bicycle system, particularly surfaces of the lower back and legs, thereby lessening formation of a wake region, and developing thrust. The vent can be attached to the bicycle by any suitable means, such as using fasteners or screws.

Figure 5:
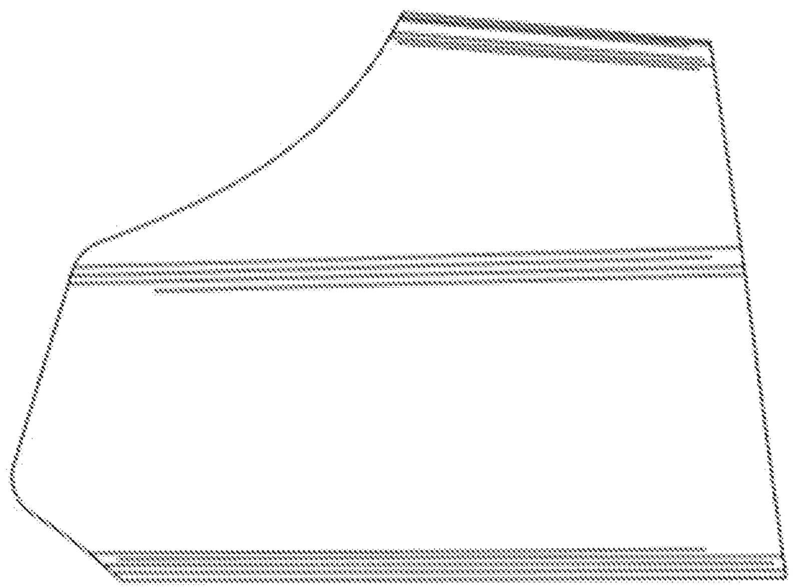
FIG. 5 is a side view of the vent that can be attached to a bicycle.
Figure 6:
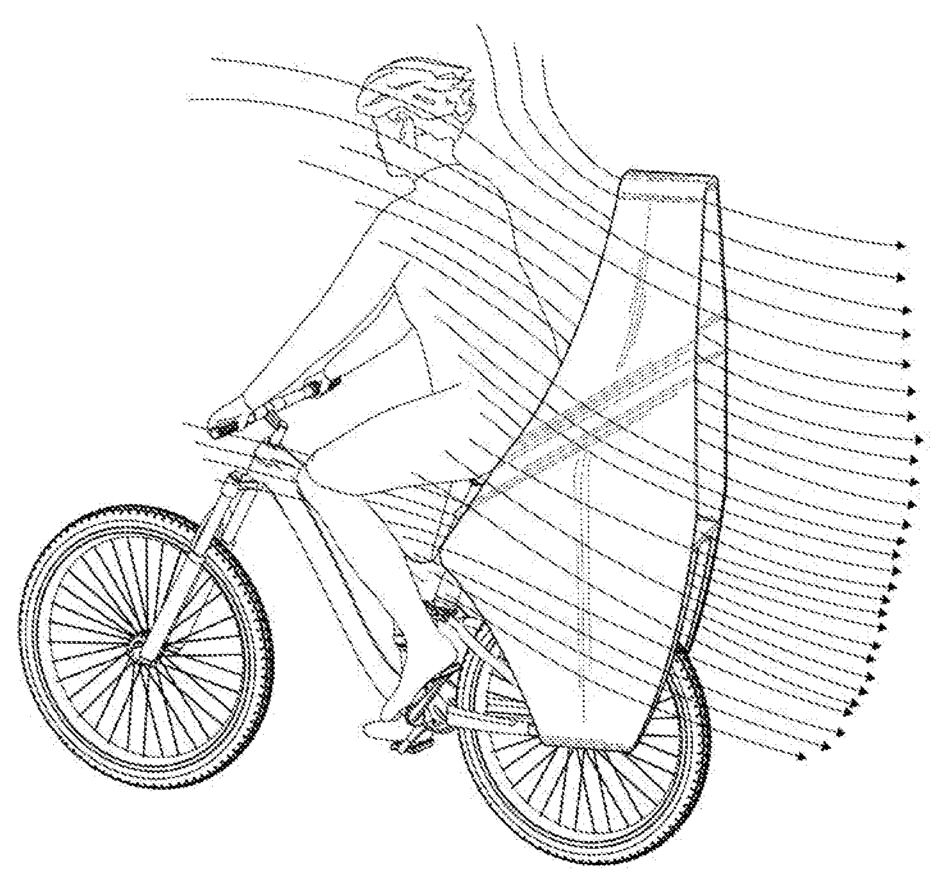

FIG. 6 shows a different embodiment of the vent of this invention. It shows continuing flow of air after rear-facing surfaces of a bicycle rider, the rider being in upright posture. The figure further shows the promotion of laminar flow instead of a turbulent wake region and developing thrust by use of the vent of this embodiment. The vent shown in this embodiment is much taller than the embodiment shown in FIGS. 1-5.

Figure 7:
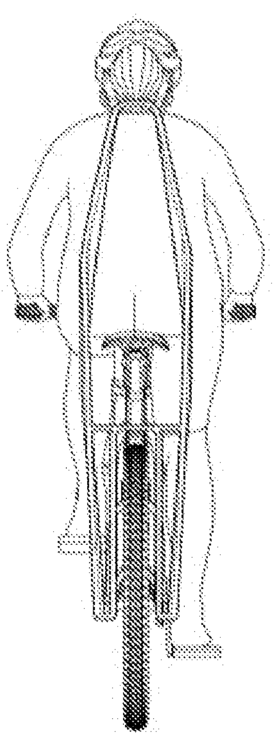

FIG. 7 is a rear view of the vent shown in FIG. 6, showing the open-ended design, which provides for throughput of air.

Figure 8:
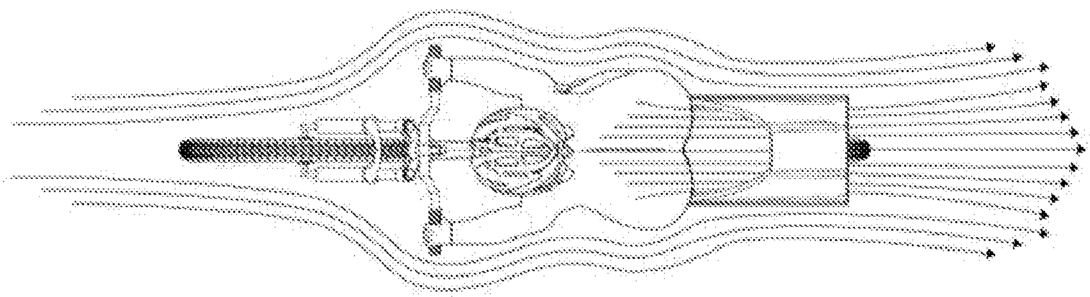

FIG. 8 is an overhead view of the vent shown in FIG. 6 showing the airflow distribution around the cyclist.

Figure 1:
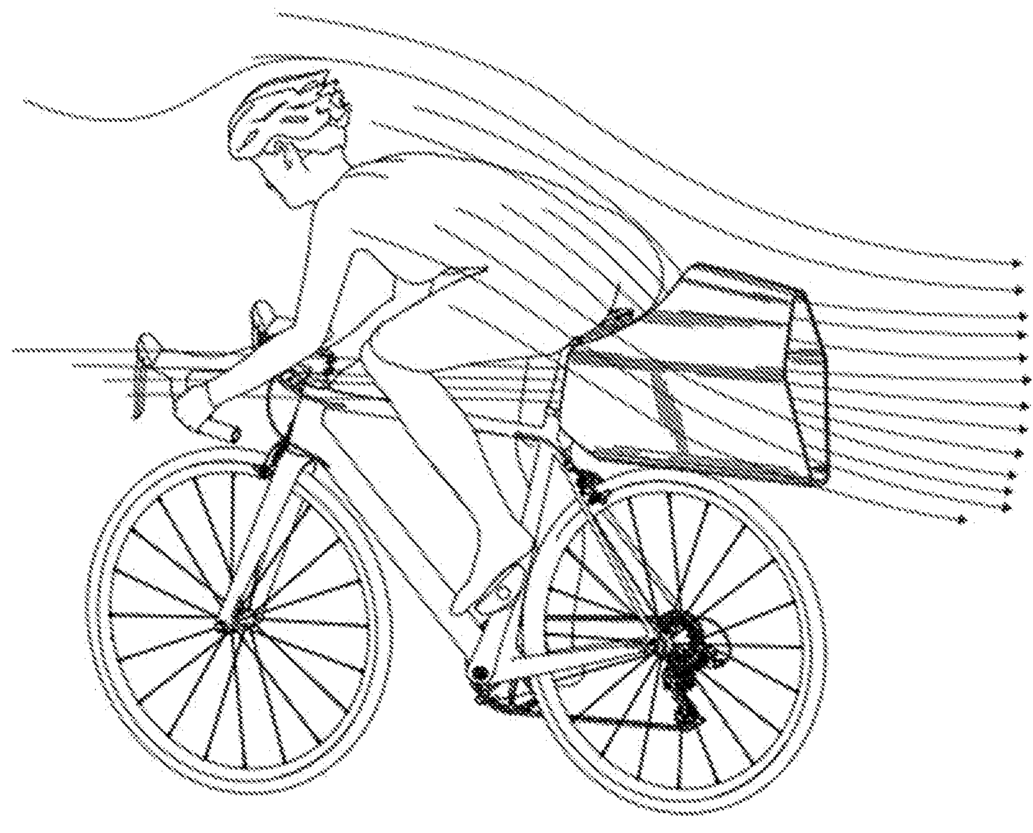
Figure 2:
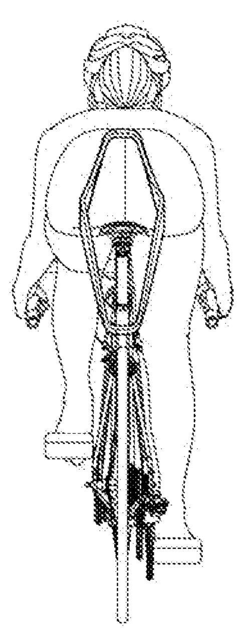
FIG. 2 shows rear view of the vent of the present invention. It illustrates the open-ended design of the vent and throughput of air through the vent.
Figure 3:
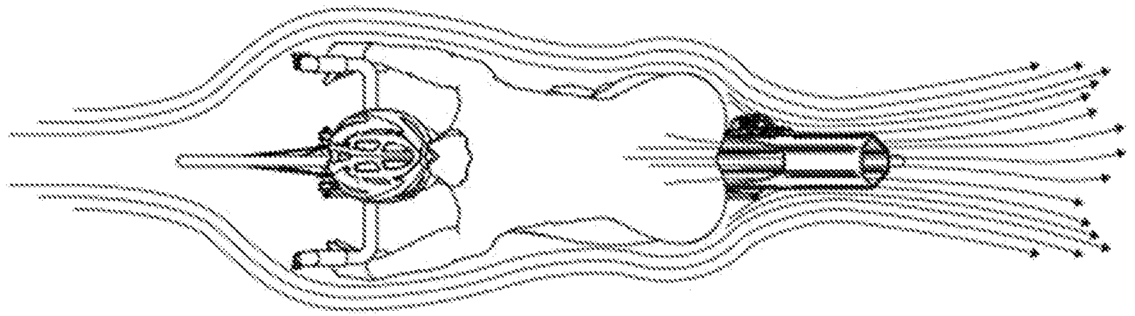
FIG. 3 is an overhead view of the vent of the present invention showing air distribution when riding.
Figure 4:
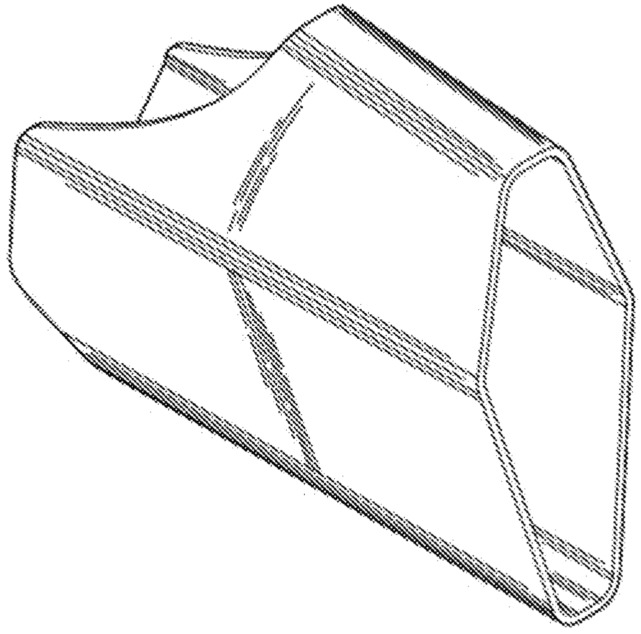
FIG. 4 is an isometric view of the vent prior to connecting to the vehicle.
Figure 9:
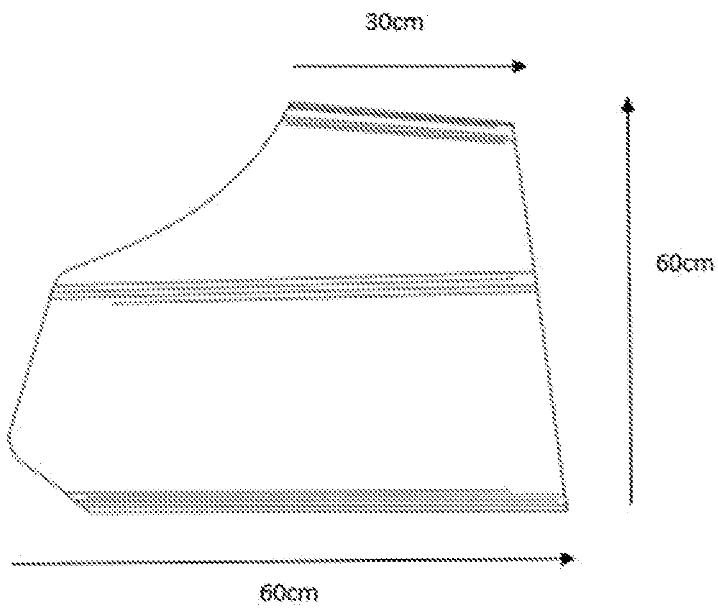

FIG. 9 is a side view of the bicycle vent (as shown in FIGS. 1, 4 and 5), showing suitable dimensions.

Figure 10:
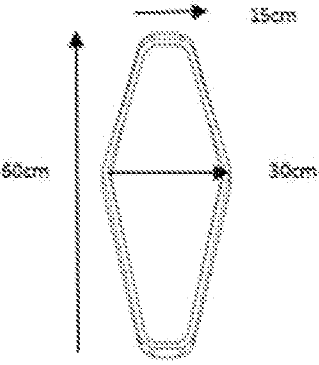

FIG. 10 is a rear view of the bicycle vent (as shown in FIGS. 1, 4 and 5), showing suitable dimensions.

Figure 11:
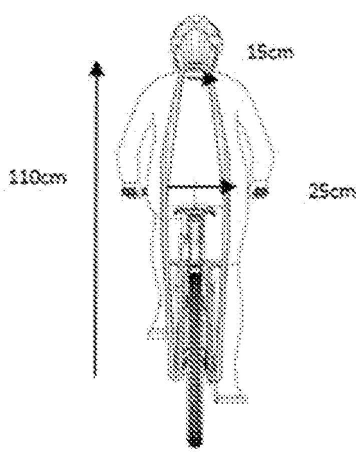

FIG. 11 is a rear view of the bicycle vent (shown in FIG. 6) displaying upright body of cyclist, minimum and maximum width (15 cm and 25 cm), and height (110 cm).

Figure 12:
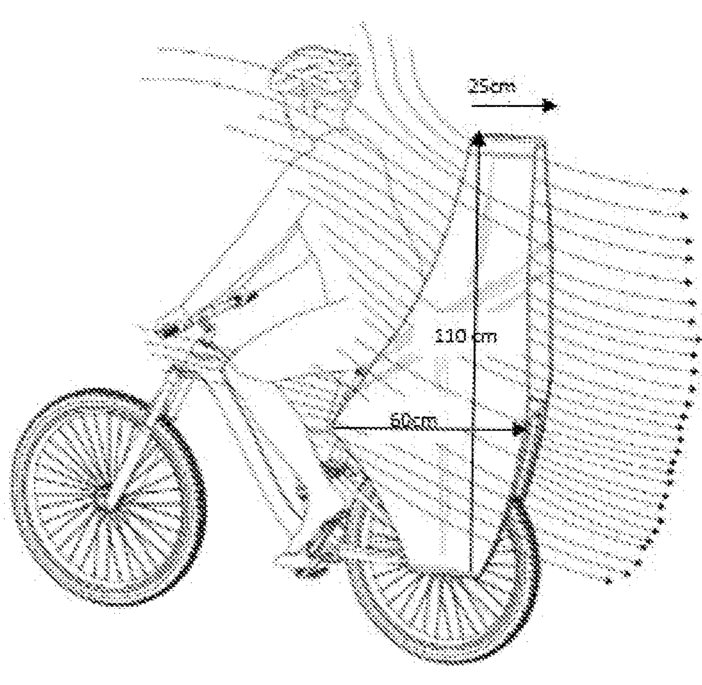

FIG. 12 is an illustration of the rear-top-left perspective of bicycle vent (shown in FIG. 6) showing upright body of cyclist, with finer arrowed lines indicating flow through of air, and bold arrowed lines marking minimum and maximum length (25 cm and 60 cm), and height (110 cm).

Figure 13:
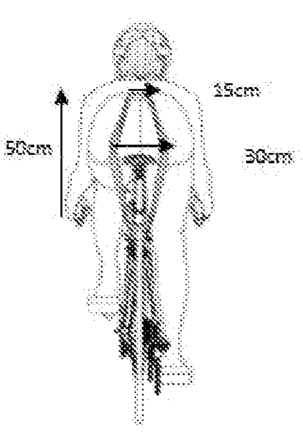

FIG. 13 is a rear view of vent (as shown in FIG. 1) for rider-bicycle system, addressing flow at lower back and thighs, marked for height (50 cm) and for minimum and maximum width (15 cm and 30 cm).

Figure 14:
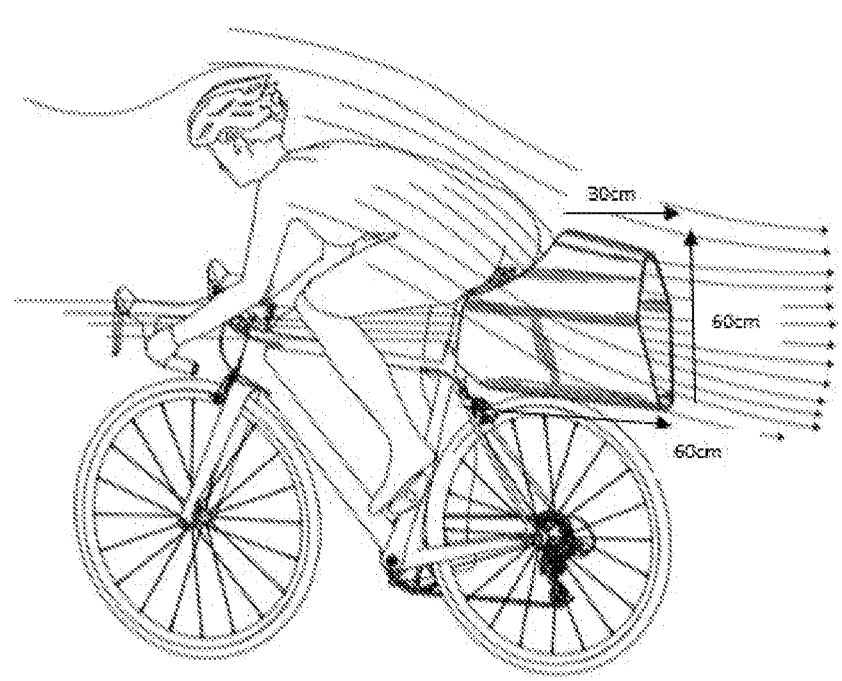

FIG. 14 is a rear-top-left perspective view of vent (as shown in FIG. 1) for rider-bicycle system, addressing flow at lower back and thighs, marked for height (60 cm), and for length at top and in full (30 cm and 60 cm).

The embodiments illustrated in FIGS. 15 to 20 show the invention used in relation an enclosed motor vehicle such as a motor car.

Figure 15:
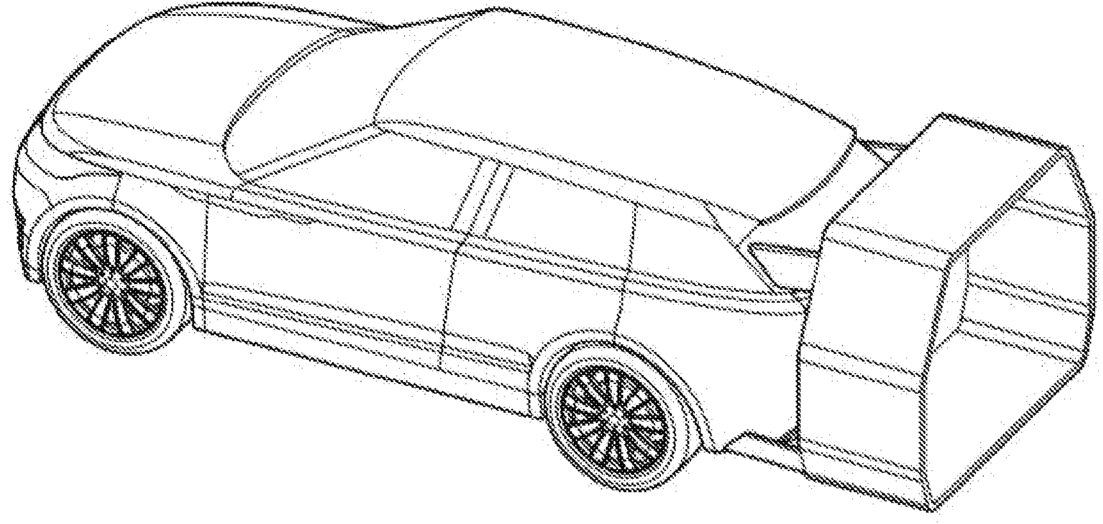

FIG. 15 is an illustration of rear-top-left perspective of a vent used in an enclosed motor vehicle. The vent can be attached to the rear of the car by any suitable means such as connectors and screws.

Figure 16:
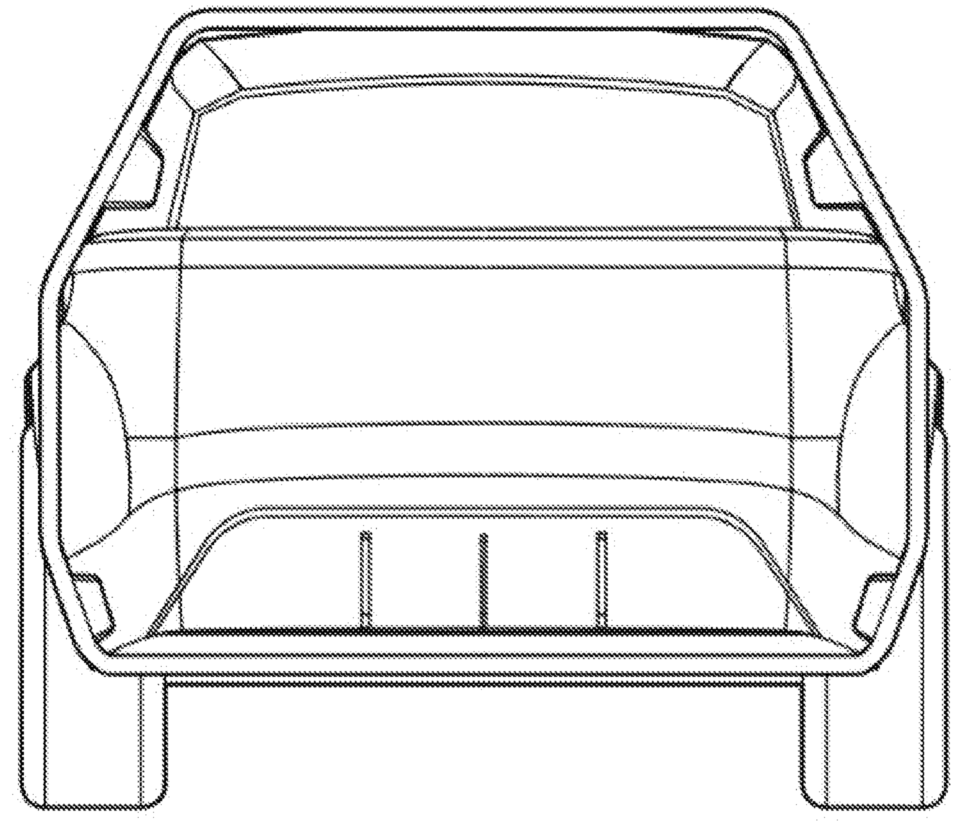

FIG. 16 is an illustration of rear view of a vent used in an enclosed motor vehicle.

Figure 17:
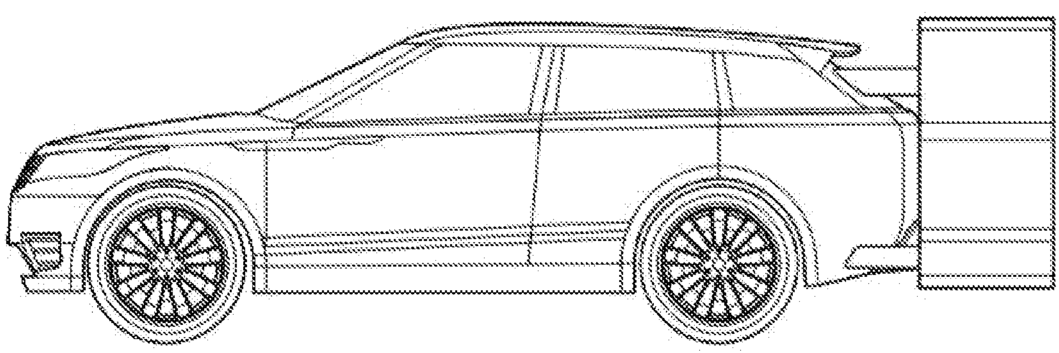

FIG. 17 is a side view of a vent for an enclosed motor vehicle.

Figure 18:
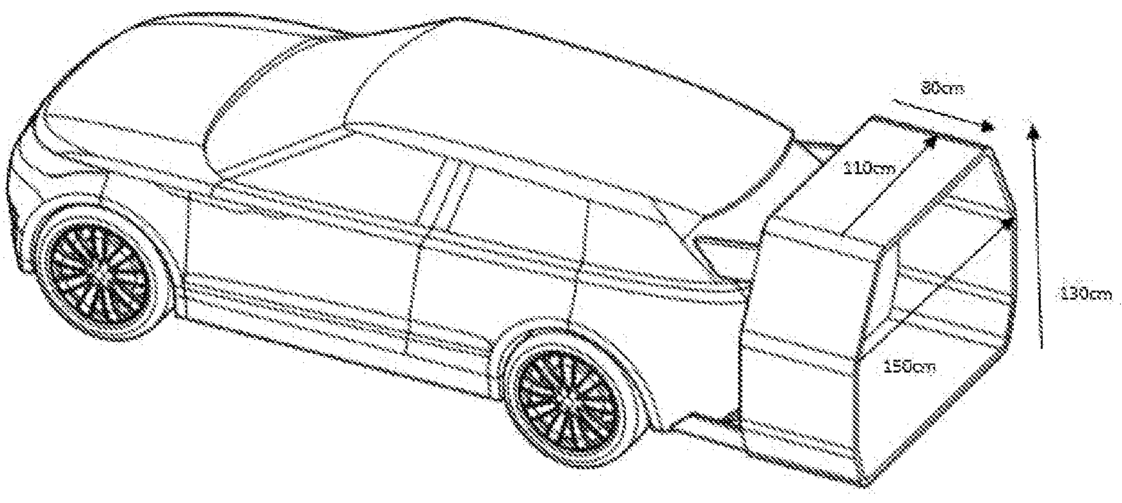

FIG. 18 is a rear-top-left perspective of a vent for enclosed vehicle, showing suitable dimensions.

Figure 19:
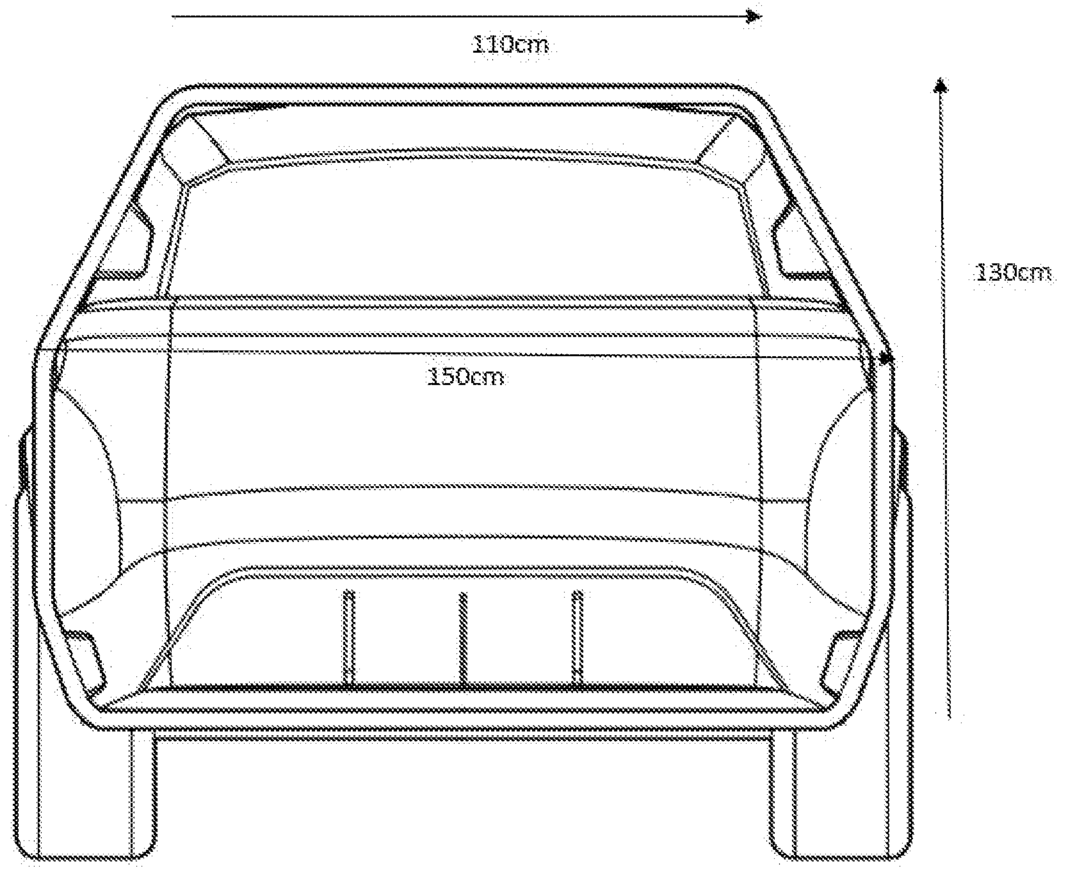

FIG. 19 is a rear view of a vent for an enclosed vehicle, showing suitable dimensions.

Figure 20:
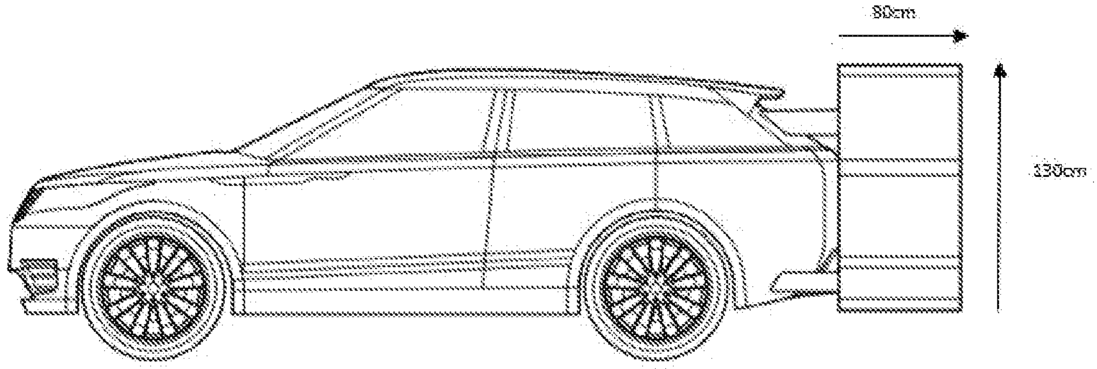

FIG. 20 is a side view of a vent for an enclosed vehicle, showing suitable dimensions.

FIGS. 21 to 26 illustrate the use of this invention in a motorised open air vehicle such as a motorcycle.

Figure 21:
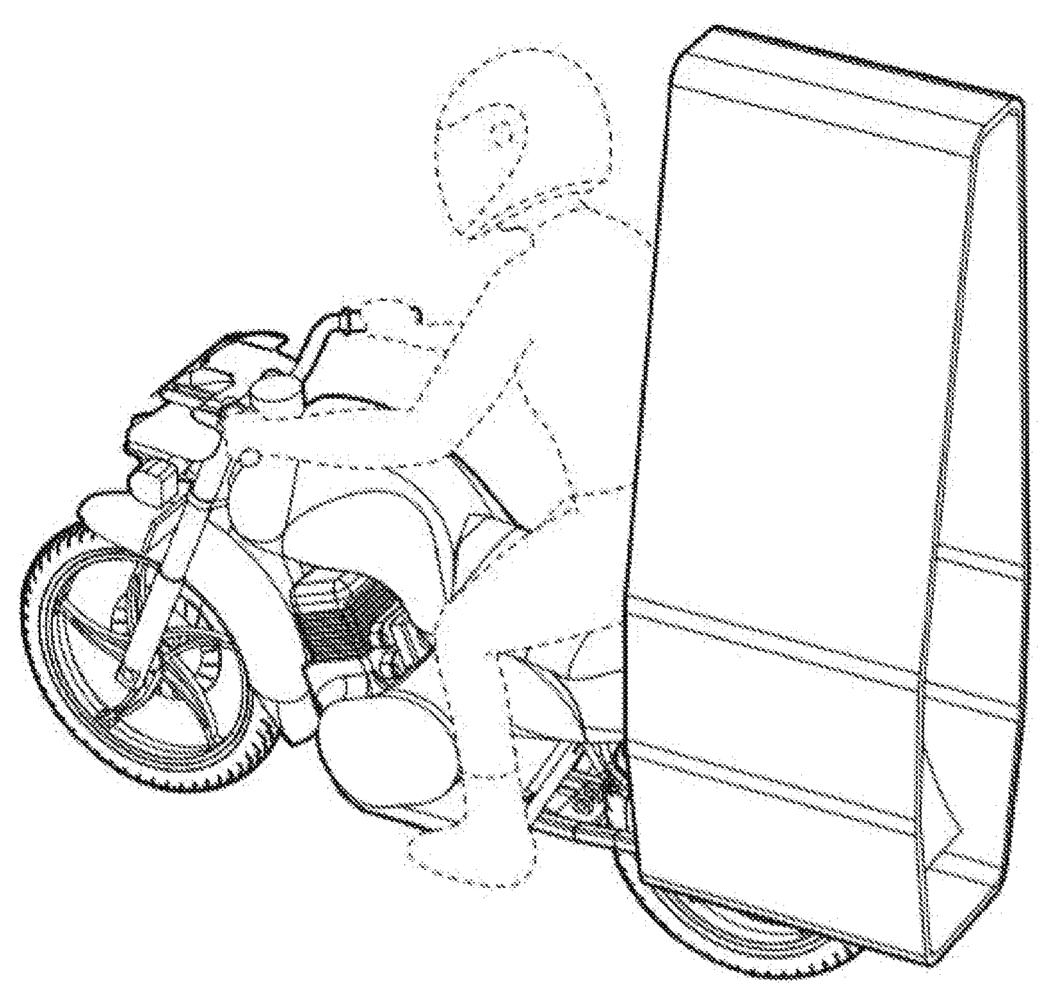

FIG. 21 is a rear-top-left perspective view of the vent of the present invention attached to a motorcycle showing the vent extending above plane of the rider.

Figure 22:
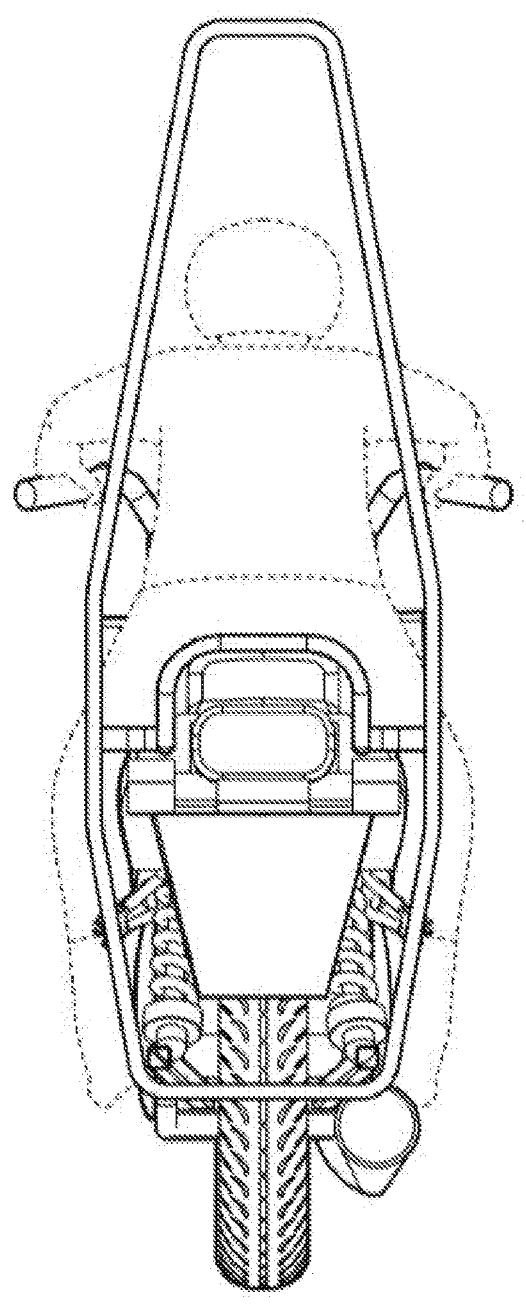

FIG. 22 is the rear view of the vent of the present invention attached to a motorcycle showing vent extending above the plane of the rider.

Figure 23:
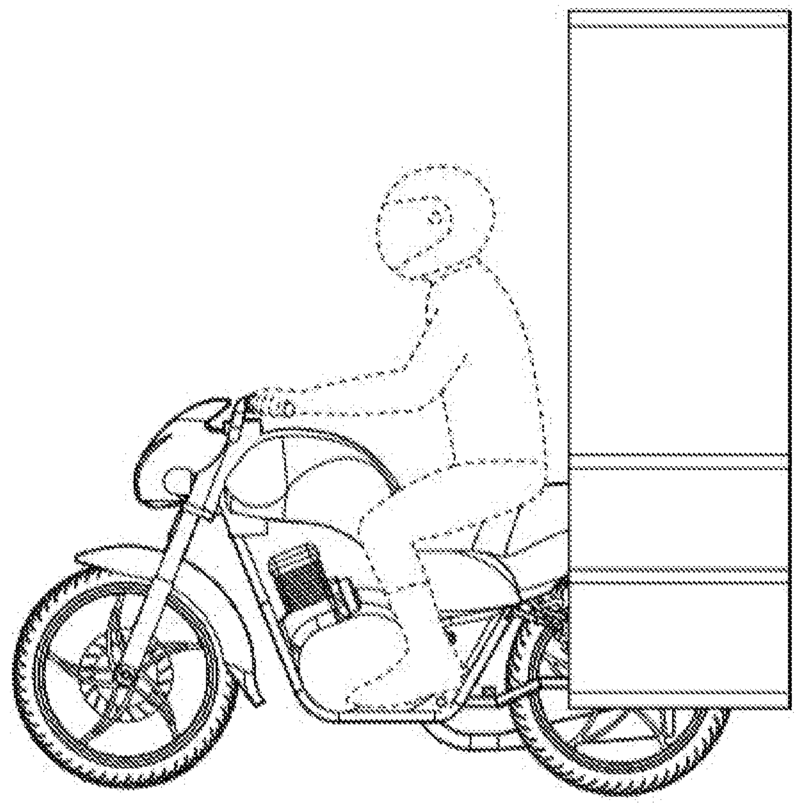

FIG. 23 is a side view of the vent of the present invention attached to a motorcycle showing vent extending above the plane of the rider.

Figure 24:
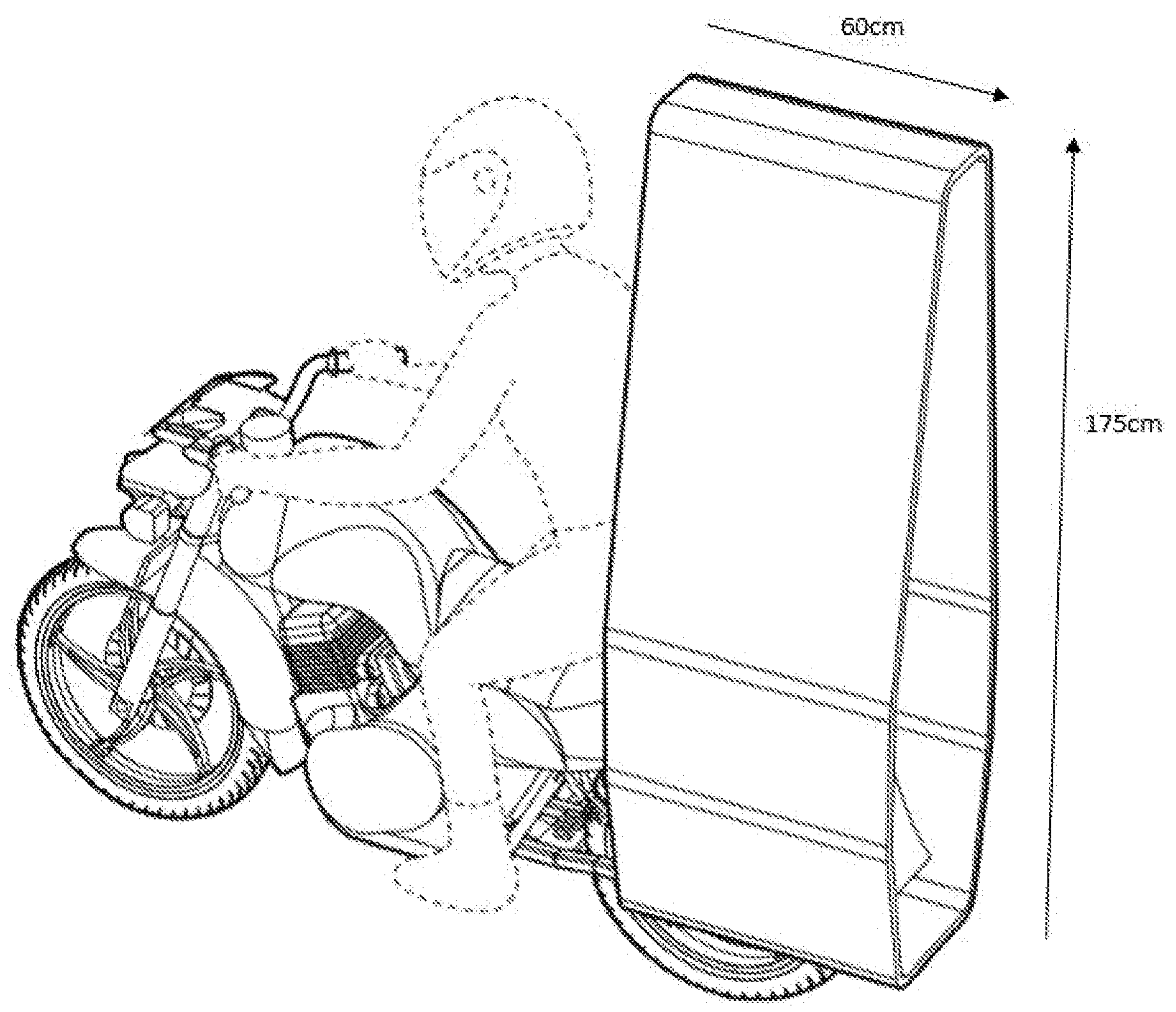

FIG. 24 is a rear-top-left perspective of vent for a motorcycle, with vent extended above plane of rider, showing suitable dimensions.

Figure 25:
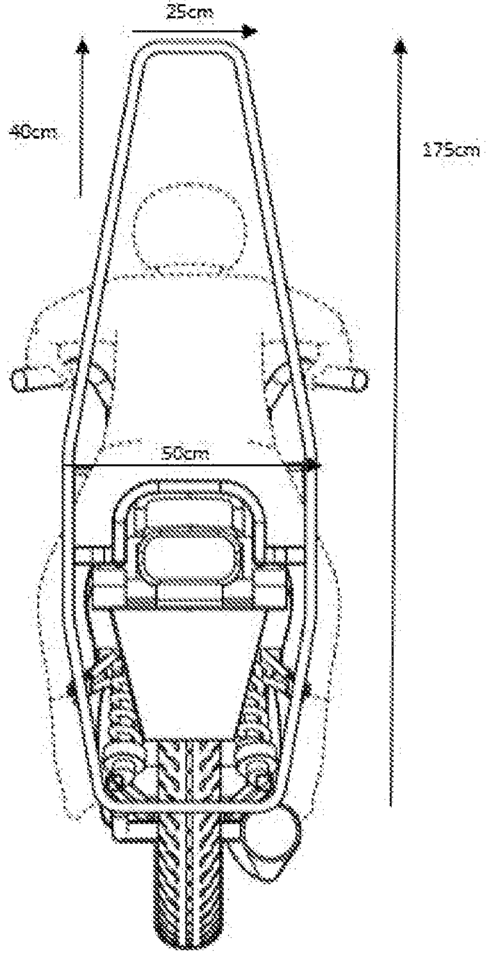

FIG. 25 is a rear view of the vent for a motorcycle, with vent extended above plane of rider, showing suitable dimensions.

Figure 26:
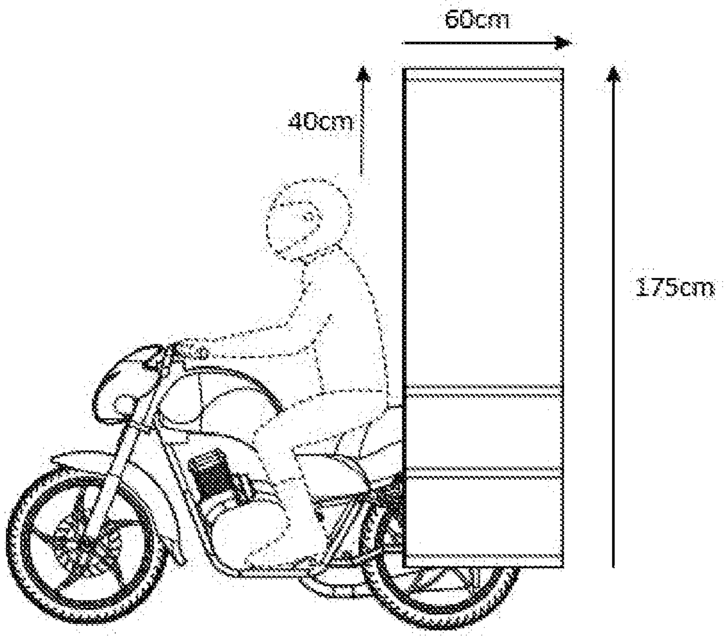

FIG. 26 is a side view of the vent for a motorcycle, with vent extended above plane of rider, showing suitable dimensions.

Figure 27:
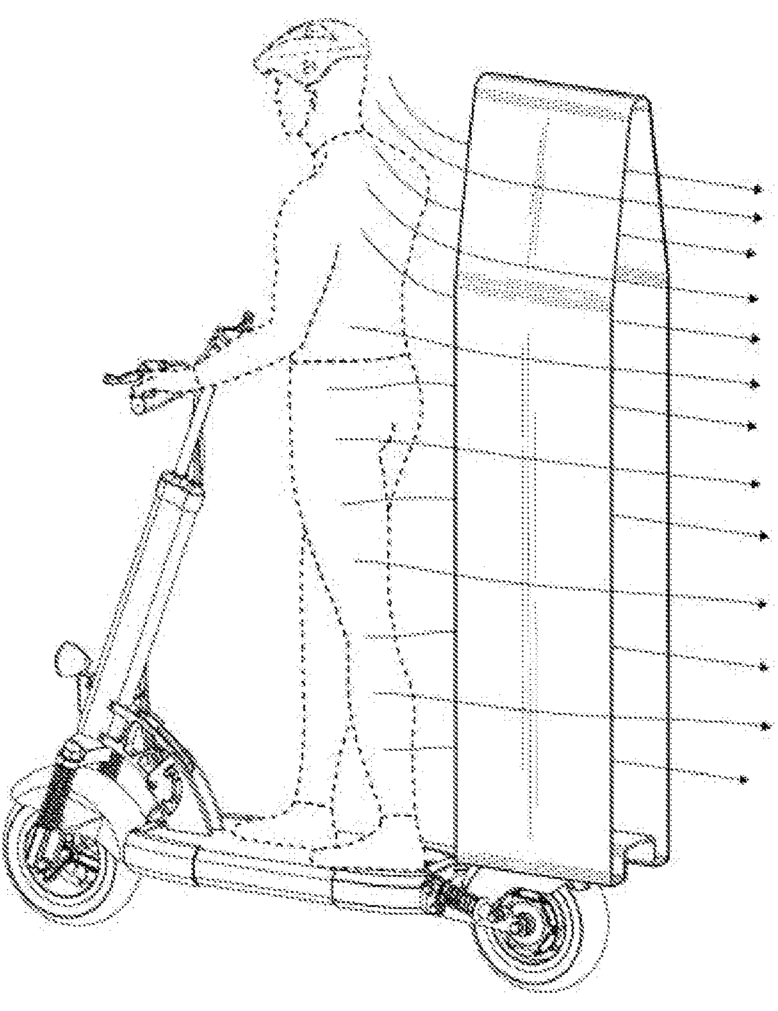
Figure 28:
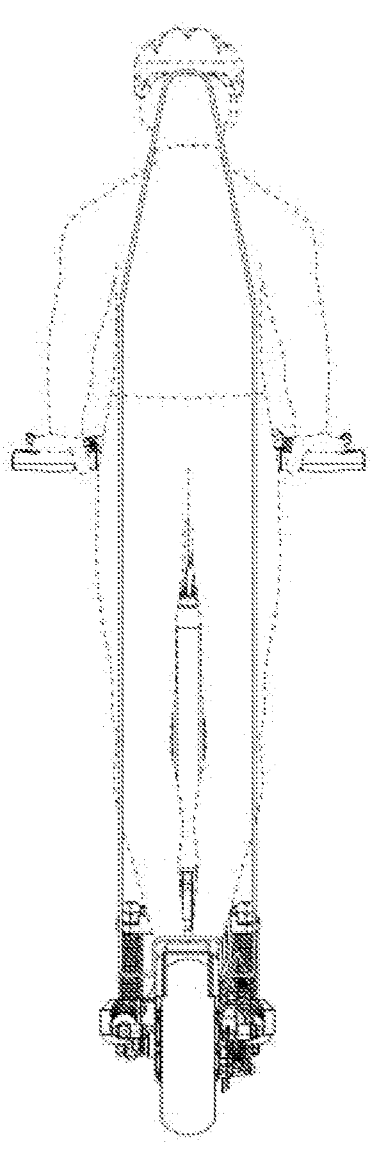
Figure 29:
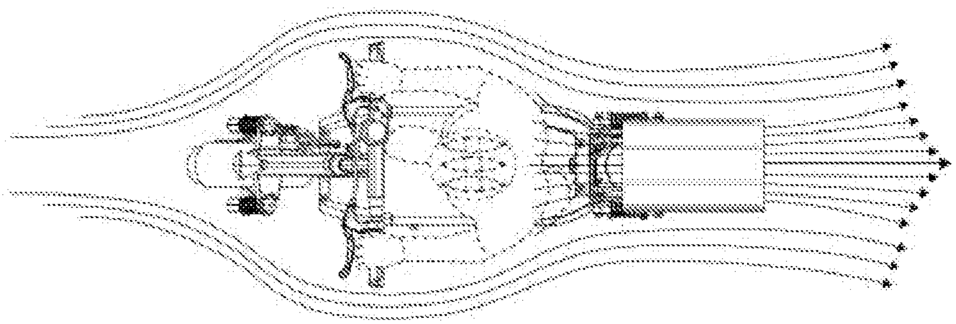

FIGS. 27 to 29 illustrate the use of the present invention in relation to an e-scooter.

FIG. 27 is a rear-top-left perspective view of the vent of the present invention attached to an e-scooter.

FIG. 28 is the rear view of the vent of the present invention attached to an e-scooter.

FIG. 29 is an overhead view of the vent of the present invention attached to an e-scooter.

Figure 30:
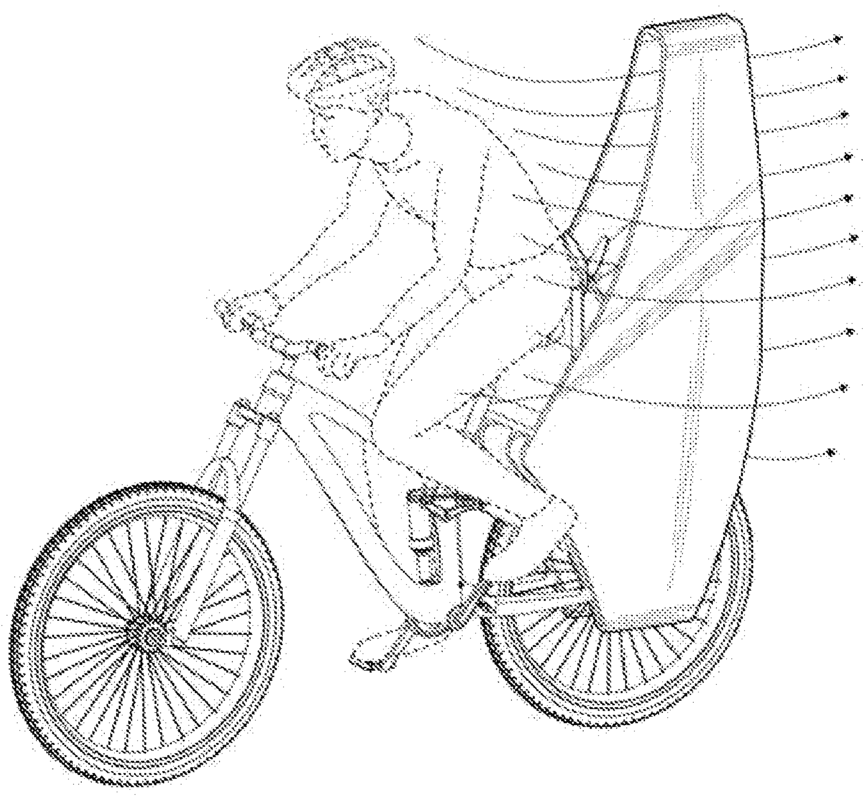
Figure 31:
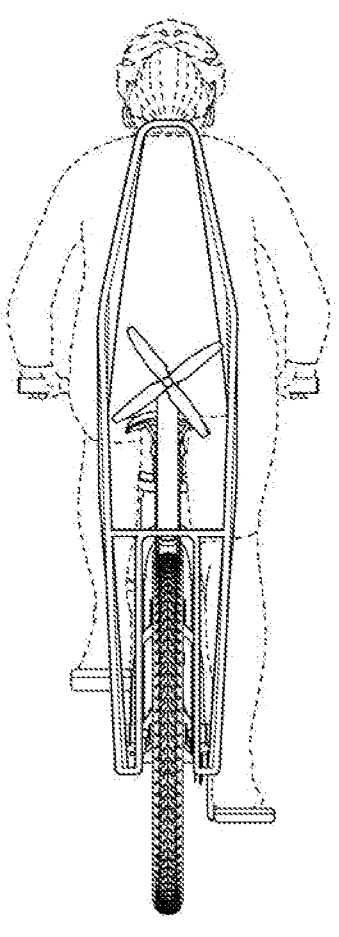
Figure 32:
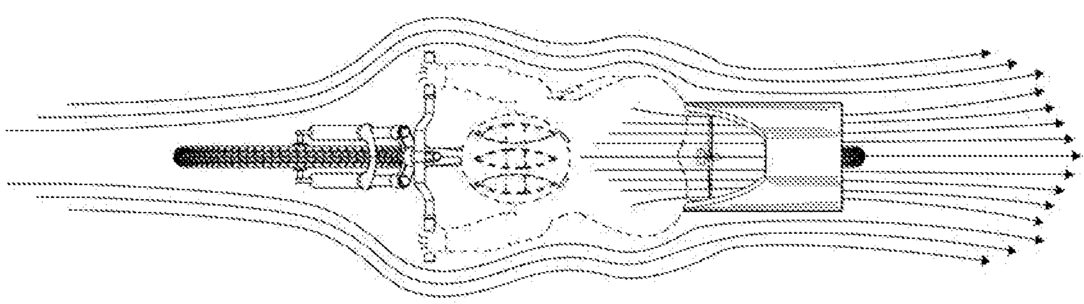

FIGS. 30 to 32 illustrate the use of a fan propeller along with the present invention.

FIG. 30 is a front-top-left perspective view of the vent of the present invention attached to a bicycle, with a fan or propellor placed within.

FIG. 31 is a rear view of the vent of the present invention attached to a bicycle, with a fan or propellor placed within.

FIG. 32 is an overhead view of the vent of the present invention attached to a bicycle, with a fan or propellor placed within.

Figure 33:
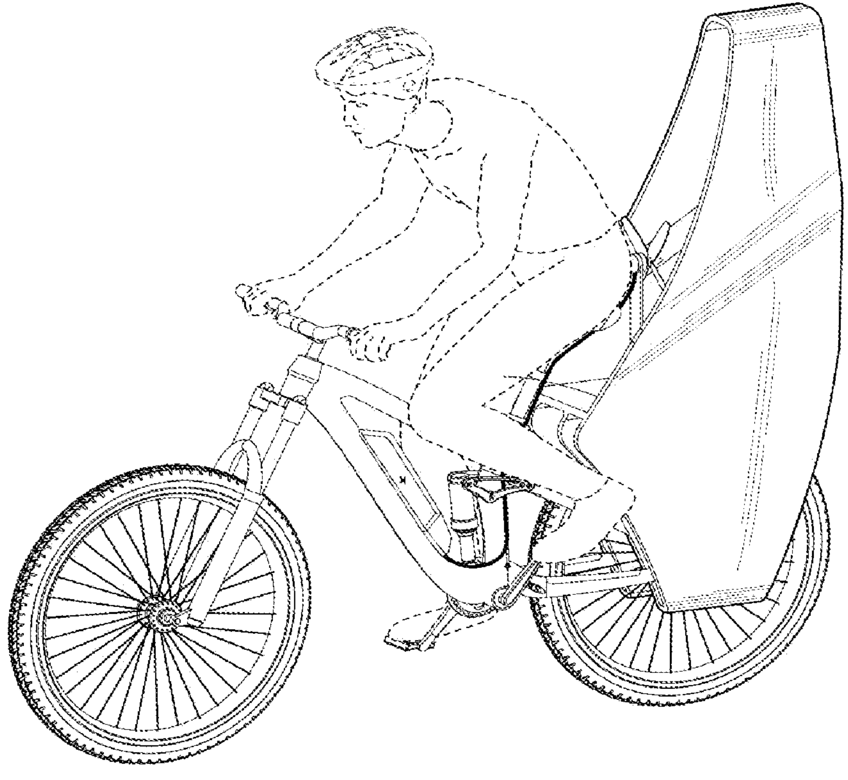

FIG. 33 is a perspective view of a vent of the present invention attached to a bicycle, wherein a fan or propeller is placed within the vent and a rechargeable battery is attached to the bicycle for powering the fan or propeller.

Figure 34:
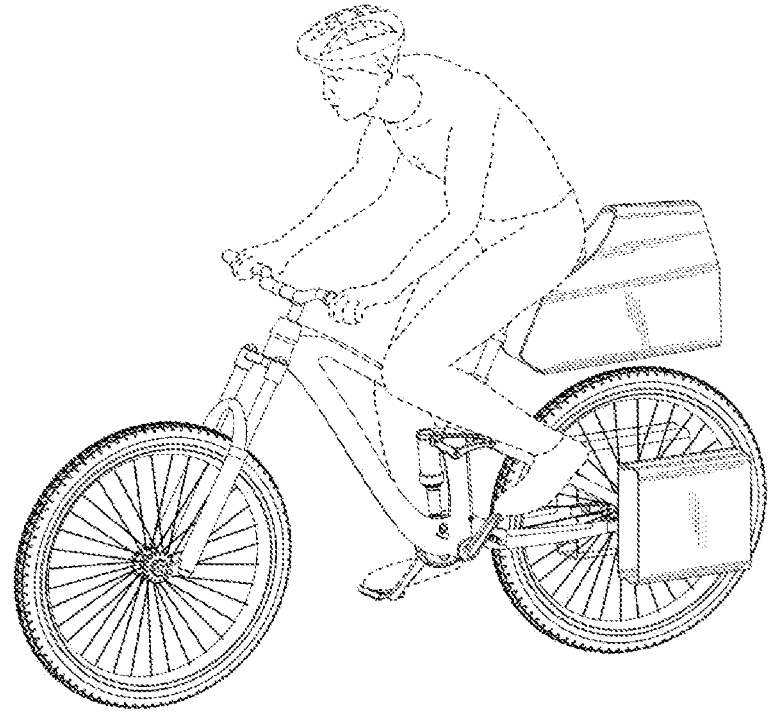

FIG. 34 is a perspective view of another embodiment of the present invention wherein multiple vents are attached to a bicycle.

Figure 35:
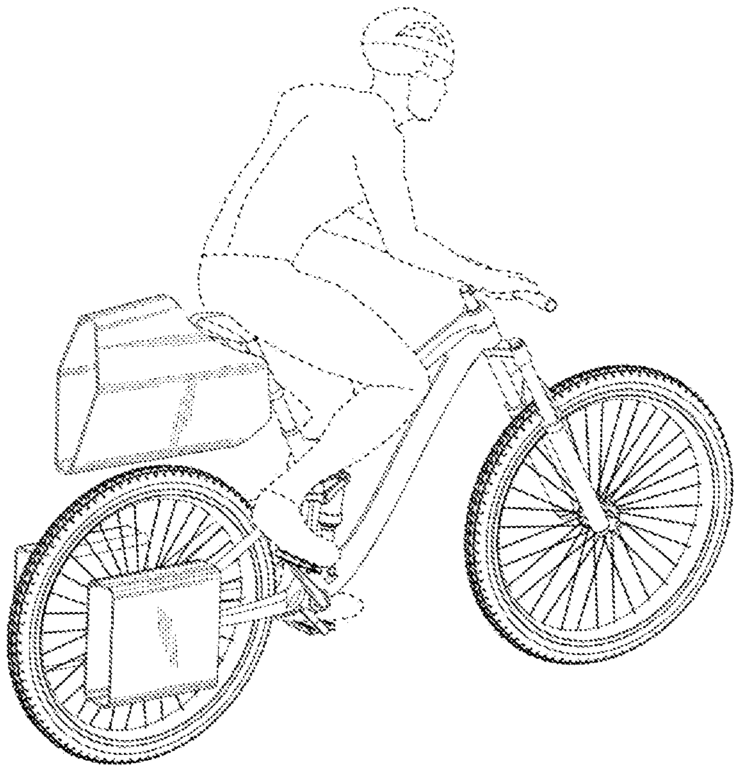

FIG. 35 is another perspective view of the embodiment in FIG. 34.

Figure 36:
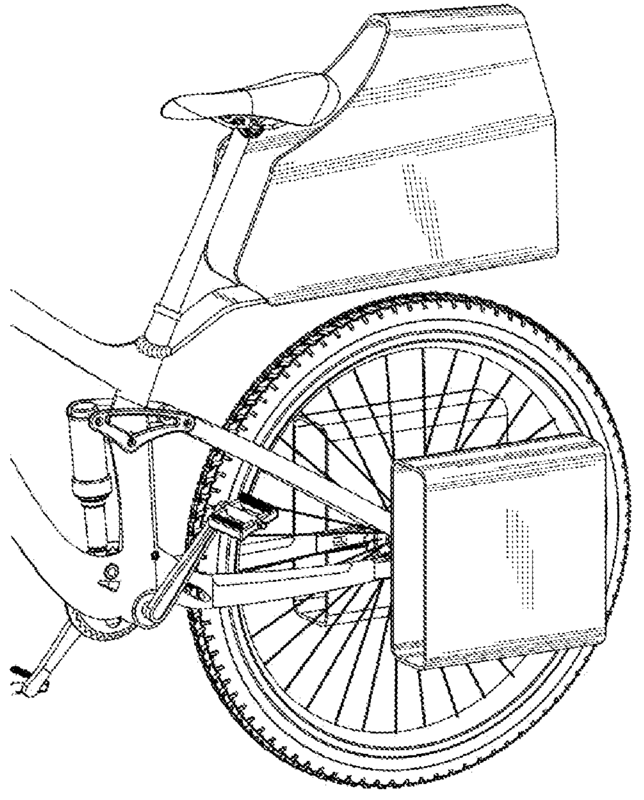

FIG. 36 is a closer view of a vent of the present invention, wherein the vent is attached permanently with a bicycle.

Figure 37:
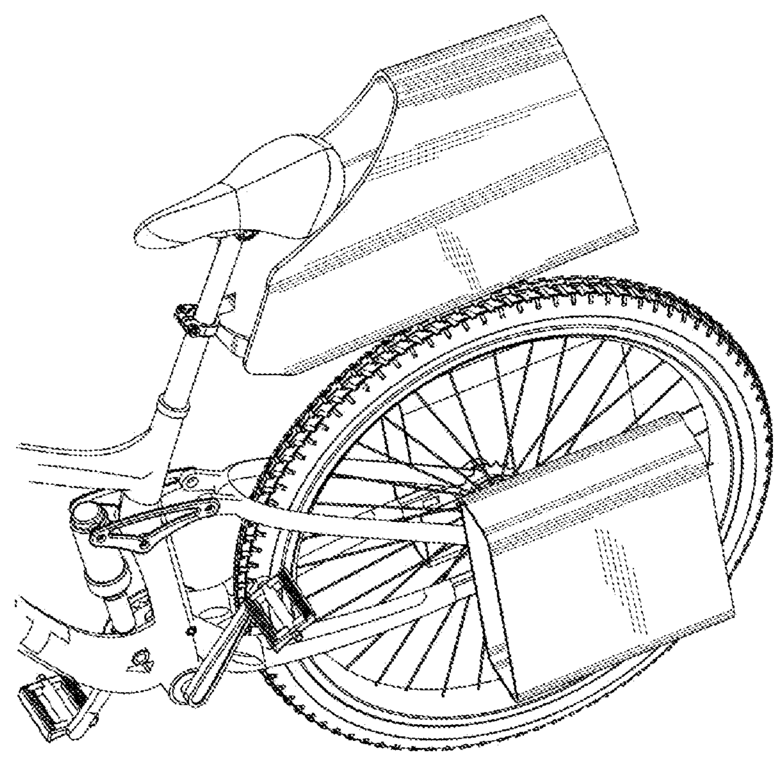

FIG. 37 is a closer view of a vent of the present invention, wherein the vent is attached temporarily with a bicycle.

Figure 38:
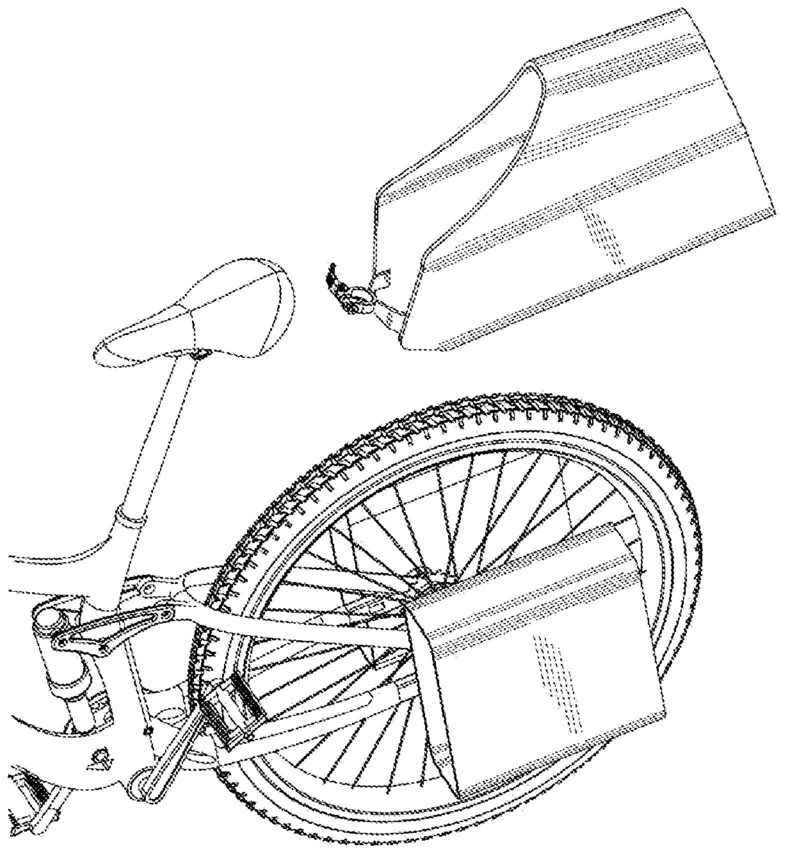

FIG. 38 a closer view of a vent of the present invention, wherein the vent is detached from a bicycle temporarily.

It should be noted that the shape of the vent is not limited to the embodiments shown in these figures. What are shown in the diagrams are a set of examples only. The cross section and the shape of the vent can be greatly varied, providing that the vent is capable of drawing air at the end closest to the main body of the vehicle (proximal end) and expelling air at the other end (distal end). Ideally, the vent should cover a significant portion of the rear surfaces, and address the main areas of turbulence and potential wake formation. In some embodiments the vent could extend beyond the plane of the vehicle. For example, in the embodiments shown in FIGS. 21 to 26, the vent is extended above the vertical plane of the rider, allowing air to be drawn through above the rider, promoting laminar flow instead of turbulence in this region.

In each of the embodiments described above, the vent is positioned spaced from rear facing external surface of the vehicle and affixed to the main body of the vehicle by one or more connecting members. The space between the vent and the vehicle is determined in such a way as to address wake and boundary layer formation of a moving vehicle.

The air contained in the vent is expelled opposite to the vehicle's direction of travel, beginning with the vehicle's first movement, and with continued movement of the vehicle the air flowing by the rear surface of the said vehicle is drawn at the proximal end and then expelled through the distal end.

The embodiments shown in the drawings demonstrate a single vent. However it is possible to have multiple vents broken into segments to achieve the same results. Making them in multiple sections may allow for easier transport and assembly. In addition such a construction would provide additional strength and rigidity to the vent.

It should be noted that the cross sectional area of the vents described above are in longitudinal alignment with a significant part of the rear surfaces of the vehicle.

The vent can be fully integrated to the frame of the vehicle permanently or detachable when required. If required, more than one vent can be attached to the vehicle.

The material of construction can be any light material such as thermoplastic, carbon fibre reinforced polymers, aluminum, or other materials robust to conditions produced or encountered by the vehicle during travel. The thickness of the material can range from very thin (for instance 3 mm) to several centimetres or more, depending on the strength of the material, and the level of air resistance to be encountered.

The vent can be moulded in one piece using a light thermoplastic material, carbon fibre reinforced polymer or light metal or it can be made in sections.

As indicated earlier, the dimensions and the shape of the vent can be varied to optimise passage of air through the vent. In the example shown in FIG. 1, the height of the vent is about 60 CM while the width at the top and bottom is about 30 CM. The widest area at the middle has a width of about 60 CM. These dimensions allow for smooth passage of air from the proximal end to the distal end.

In the embodiment shown in FIG. 6, the height of the vent is approximately 110 CM. The width at the widest area is about 60 CM. The top of the vent has a width of about 15 CM.

On the other hand, in the embodiment shown in FIG. 26, the height of the vent is approximately 175 CM, rising above the height of the seated rider.

In the embodiment shown in FIGS. 15 to 20, applicable to a motor vehicle, the width of the vent is around 150 CM while the height is about 130 CM. It has a length of about 80 CM.

In the embodiment shown in FIGS. 27, 28, and 29, the width of the vent is around 30 CM, while the height is about 160 CM. It has a length of about 30 CM.

In the embodiment shown in FIGS. 30, 31 and 32, the height of the vent is approximately 110 CM. The width at the widest area is about 60 CM. The top of the vent has a width of about 15 CM.

The mechanism for attaching any of the above described vents to a vehicle can vary and will be apparent to a person skilled in the relevant art.

While various embodiments of the present invention have been described above, it should be understood that they have been presented by way of example only, and not by way of limitation. It will be apparent to a person skilled in the relevant art that various changes in form and details including the dimensions can be made therein to suit different vehicles without departing from the spirit and scope of the present invention. Thus, the present invention should not be limited by any of the above described exemplary embodiments.

The claims defining the invention are as follows:

1. An apparatus for reducing overall drag of a vehicle, said apparatus comprising at least one vent, said at least one vent having a proximal end and a distal end, wherein each of said proximal end and said distal end is open and is positioned and aligned longitudinally in a direction of travel, wherein said at least one vent comprises a hollow body defining an internal airflow passage extending between said proximal end and said distal end, said hollow body being formed by a plurality of contiguous surfaces, and wherein said at least one vent is positioned spaced apart from all external surfaces of the vehicle by at least one connecting member and removably attachable to the vehicle by said at least one connecting member, so that said proximal end faces a rear-facing surface and draws air flowing by said rear-facing surface.

2. An apparatus as claimed in claim 1 wherein the air contained in the vent is expelled opposite to the vehicle's direction of travel, beginning with the vehicle's first movement, and with continued movement of the vehicle the air flowing by the rear-facing surface of the said vehicle is drawn at the proximal end and then expelled through the distal end.

3. An apparatus as defined in claim 2 where the cross-sectional area of the said vent or vents is in longitudinal alignment with a significant part of the rear-facing surface of the vehicle so that the proximal end of the vent draws air flowing by this surface, beginning with the vehicle's first movement.

4. An apparatus as defined in claim 1 where the vent is moulded in one piece using a light thermoplastic material, carbon fibre reinforced polymer or light metal.

5. An apparatus as defined in claim 4 wherein a propellor or a fan attachment is located within the vent where the rotation of the fan or the propellor is induced by the downstream airflow.

6. An apparatus as defined in claim 5 where the propellor or the fan attachment is powered by an external power source such as a rechargeable battery.

7. An apparatus as defined in claim 3 wherein the vent is moulded in several sections.

8. An apparatus as defined in claim 4 wherein the dimensions of said vent are approximately 60 CM high, about 30 CM wide in the middle, about 30 CM long at top and about 60 CM long in full.

9. An apparatus as defined in claim 4 wherein the dimensions of the vent are about 150 CM width, 130 CM height and 80 CM length.

10. An apparatus as defined in claim 4 wherein the vent is approximately 175 CM high, 60 CM long and 50 CM wide at the middle.

11. An apparatus as defined in claim 4 wherein the vent is approximately 175 CM high, 60 CM long and 50 CM wide at the middle.

12. An apparatus as defined in claim 4 where the thickness of the vent is about 1 to 20 MM.

13. A method of reducing aerodynamic forces and drag on a moving vehicle by attaching to the vehicle permanently one or more vents as defined in claim 1.

14. A method of reducing aerodynamic forces and drag on a moving vehicle by attaching to the vehicle temporarily one or more vents as defined in claim 1.

15. An apparatus according to claim 1, wherein said apparatus comprises multiple vents.

16. An apparatus according to claim 15, wherein said multiple vents are affixed to said vehicle by multiple connecting members.

17. An apparatus for reducing drags of a vehicle comprising:

at least one vent having a proximal end and a distal end;

wherein said at least one vent comprises a hollow body defining an internal airflow passage extending between said proximal end and said distal end, said hollow body being formed by a plurality of contiguous surfaces, wherein said at least one vent is attached to said vehicle by at least one connecting member so that said at least one vent is spaced apart from all external surfaces of said vehicle.

18. An apparatus for reducing drags of a vehicle comprising:

at least three vents each having a proximal end and a distal end;

wherein each of said at least three vents comprises a hollow body defining an internal airflow passage extending between said proximal end and said distal end, said hollow body being formed by a plurality of contiguous surfaces, wherein said at least three vents are attached to said vehicle and said at least three vents are spaced apart from all external surfaces of said vehicle.

* * * * *